United States Patent [19]

Vehmas et al.

[11] Patent Number: 4,588,769

[45] Date of Patent: May 13, 1986

[54] MULTIPURPOSE FIRE RESISTANT SEALING AND CAULKING COMPOUND

[75] Inventors: Olavi E. Vehmas, Bridgewater; Bernard L. Kotyuk, Manville, both of N.J.; John M. Pallo, Englewood, Colo.

[73] Assignee: Manville Sales Corporation, Denver, Colo.

[21] Appl. No.: 696,957

[22] Filed: Jan. 31, 1985

[51] Int. Cl.⁴ .................... C09D 5/18; C09D 5/34
[52] U.S. Cl. .................... 524/448; 106/16; 106/18.11; 106/18.12; 106/18.24; 106/18.25; 106/241; 524/451
[58] Field of Search .............. 524/448, 451, 452; 106/16, 18.11, 18.12, 18.24, 218, 241, 272, 287.28, 18.25

[56] References Cited

U.S. PATENT DOCUMENTS

| | | | |
|---|---|---|---|
| 3,035,988 | 5/1962 | Cohen | 106/272 |
| 3,139,412 | 6/1964 | Sterling | 524/452 |
| 4,141,187 | 2/1979 | Graves | 52/173 R |
| 4,234,469 | 11/1980 | Ohta | 524/451 |
| 4,309,334 | 1/1982 | Valitsky | 521/55 |

FOREIGN PATENT DOCUMENTS

| | | |
|---|---|---|
| 55-14666 | 4/1980 | Japan . |
| 57-121021 | 7/1982 | Japan . |
| 57-209980 | 12/1982 | Japan . |
| 59-89371 | 5/1984 | Japan . |

*Primary Examiner*—Dennis L. Albrecht
*Attorney, Agent, or Firm*—John D. Lister; Cornelius P. Quinn; Gregory A. Evearitt

[57] ABSTRACT

A composition which has excellent fire resistance properties, never hardens or slumps, and is reusable is provided. The composition can be extruded into a caulking or sealing compound which has a high fire resistance rating of VO as measured by UL 94 Test Procedure.

The fire resistant composition of the present invention comprises:
(a) 45–60 wt. % of filler;
(b) 12–30 wt. % ceramic fiber;
(c) 0.1–0.5 wt. % reinforcing agent;
(d) 18–30 wt. % tackifying agent; and
(e) 2–5 wt. % oleoresinous oil.

10 Claims, No Drawings

MULTIPURPOSE FIRE RESISTANT SEALING AND CAULKING COMPOUND

This invention relates to a novel composition useful as a multipurpose sealing and caulking compound.

The existence of various kinds of sealing and caulking compounds is well known in the building industry. Such caulking and sealing compounds help prevent liquid and gas leakage around openings into outdoor and indoor walls, boxes, fixtures, machinery, lights, and other electrical and communication equipment. The physical and chemical properties of and therefore the utility of each individual caulking and/or sealing compound will vary with the particular formulation of ingredients involved. Indeed the utilities of many such caulking compounds have been severely limited.

Asbestos containing caulking and sealing compounds were developed in the past and were shown to have good commercial acceptance. However, the purported health hazards of asbestos have severely limited the commercial acceptability and practicality of using such asbestos based products.

While the market is replete with non-asbestos containing caulking and sealing compounds, most of these products have some limitations which limit their commercial usefulness. For one thing such products will tend to harden upon storage even at room temperature let along relatively higher and lower outdoor temperatures. The fact that they harden severely limits their ability to be utilized in a wide variety of temperature and environmental conditions.

The limitations caused by the hardening of a caulking and/or sealing compound can be both readily observed and understood when such a compound is applied to the outer surface of a pipe. As the pipe is exposed to relatively high or low temperatures, the pipe will expand and contract accordingly. In the course of such expansion or contraction by the pipe, the caulking material coating the surface of the pipe will harden and crack thus destroying the effectiveness of the caulking or sealing compound.

Another important property of a caulking or sealing compound is its fire resistance rating. Because of the terrible destruction that fires cause in terms of both lives and property damages, many jurisdictions are adopting increasingly restrictive building codes. Even though these building codes are aimed at controlling the fire resistance of primary building materials such as pipes, valves, and other similar structures, an increasing importance is also being put on the fire resistance of more secondary building materials such as sealing and caulking materials.

In the past, caulking and sealing compounds have generally been given either a V0, V1 or V2 fire resistance rating according to Underwriters Laboratories' UL 94 flammability test. A V0 rating is higher than a V1 rating which in turn is higher than a V2 rating.

Most commercially available caulking and sealing materials have generally received only a V1 or V2 rating. The fact that very few, if any, of them have obtained a V0 rating indicates that there remains great room for improvement in the fire resistance properties of commercially available caulking and sealing compounds.

Another limitation encountered with currently available caulking and sealing compounds is that they stick too strongly to the surfaces to which they are applied and consequently are not really reusable. A caulking compound which would tend to "cling" rather than stick to applied surfaces would be much more advantageous because it would be reusable. Furthermore, the inventive caulking compound does not slump as other competitive sealing products do. Consequently, the economics of such a product would be commercially attractive.

Research was conducted in order to find a non-asbestos based caulking and sealing product which would overcome the above mentioned problems, i.e., resist hardening and slumping, have a high fire resistance rating, and be reusable and hence more economical. As a result of such research, it was found that a combination of particular ingredients such as ceramic fibers, fillers, chlorinated paraffins, tackifying agents, and oleoresinous oils resulted in a non-asbestos based material which had superior caulking and sealing properties. The inventive composition was found to not only resist hardening and slumping and be reusable but also to qualify for the high V0 fire resistance rating when tested according to UL 94.

It is therefore an object of this invention to provide a novel non-asbestos based composition which makes an extremely good caulking and sealing material for the building industry because it resists hardening and slumping, is reusable, and has the high V0 flame resistance rating according to the UL 94 test.

Other aspects, objects, and the several advantages of the present invention are apparent from the specification and the appended claims.

In accordance with the present invention, there is provided a composition which has the aforementioned excellent properties.

The general and preferred formulations for the inventive composition are listed below:

| Ingredient | Wt. % |
|---|---|
| GENERAL INVENTIVE FORMULATION | |
| filler | 45–60 |
| ceramic fiber | 12–30 |
| reinforcing agent | 0.1–0.5 |
| tackifying agent | 18–30 |
| oleoresinous oil | 2–5 |
| PREFERRED INVENTIVE FORMULATION | |
| talc | 52.4 |
| mineral wool | 18.0 |
| diatomite | 2.0 |
| polyester fiber | 0.1 |
| polypropylene pulp | 0.3 |
| chlorinated paraffin | 24.0 |
| oleoresinous oil | 3.2 |
| TOTAL | 100.0 |

The filler used in the present invention is typically an inorganic filler.

Typical inorganic fillers include but are not limited to talc, alumina, barytes, silica, iron oxides, whiting, diatomite, granulated rock wool, clay, and the like as well as mixtures of these various materials. Particle sizes will normally be in the range of from about 4 to 75 microns. Whatever inorganic filler is used should be one which does not substantially affect the caulking or sealing properties of the present invention. Primarily, the inorganic filler will be used to extend or fill out the inventive composition.

As used herein, the term ceramic fiber is intended to include any non-asbestos fibers which are produced from non-metallic inorganic materials and which are capable of withstanding temperatures of at least about 1000° F., preferably at least about 2400° F. Generic examples of such non-asbestos ceramic fibers include refractory fibers, semi-refractory fibers, glass fibers, and mineral wool (presently preferred) and combinations thereof depending upon temperature requirements.

The ceramic fibers utilized in the present invention should preferably be about 5 microns in diameter and ½-1 inch in length.

Although any commercially available reinforcing agent may be used in the present invention, organic fibers and polyolefin pulps are presently preferred.

Suitable organic fibers of this invention include polyamide fibers such as Nylon, polypropylene fibers, carbon fibers, viscose fibers and polyester fibers such as those made from an ester of dihydricalcohol and terephalic acid with ¼" polyester fibers presently preferred.

Examples of suitable polyolefin pulps include both polyethylene and polypropylene pulps with the latter most preferred. The polyethylene pulp fibers will have an average length of about 0.6–1.2 mm and an average diameter of about 30–40 microns while the polypropylene pulp fibers will have an average length of about 0.8–1.5 mm and an average fiber diameter of about 20–40 microns.

The term "tackifying agent" as used with respect to the present invention is meant to define those substances which impart tackiness or adhesive properties to the caulking or sealing compound of the present invention. Generally, such tackifying agents can be inorganic or organic in nature. High temperature resistant clays such as montmorillonite clays are examples of inorganic tackifying agents.

Organic tackifying agents are preferred with liquid chlorinated paraffins most preferred. An example of the latter is CHLOROWAX 50 ® manufactured by Diamond Shamrock Company.

Such chlorinated paraffins will preferably have a chlorine content of from 45–50 wt.% most preferably 47.5–48.0 wt.%. The viscosity (at 25° C. measured on a Brookfield Viscometer) should preferably by 120–140 cps with 125–130 cps most preferred.

Whatever tackifying agent is used should be compatible with the caulking or sealant compound and should be one which imparts the so-called "clinging properties" to the compound as discussed herein earlier. This latter point is important because it serves to distinguish the invention composition from other compounds which rigidly adhere to the surfaces to which they are applied. Because the composition of the present invention employs tackifying agents which impart clinging properties, the inventive composition can be reusable since their attraction to applied surfaces can be a reversible and hence non-permanent one.

It is believed that the oleoresinous oil utilized in the present invention functions as a processing aid serving to bind the various ingredients of the invention formulation. It also serves to be blended with the tackifying agents (most typically the chlorinated paraffins) in order to impart fire resistance properties to the present invention.

An oleoresin is typically a combination of resinous substances and essential oils occuring in or exuding from plants, e.g., benzoin and peru balsam. Other balsams include tolu and styx balsams. One oleoresin which has been found to be especially useful in the present invention is a viscous polymerized oleoresinous material called XH-43 ® OIL manufactured by S & S Chemical Company.

Generally, the inventive composition can be made from any conventional process. Typically, though, the inventive composition is made by the following generalized process:

A suitable mixer is charged with the desired quantity of inorganic filler (typically talc). The ceramic fiber is then added to the mix and agitation of the mixture is then begun. The oleoresinous oil and tackifying agent are then added followed by a thorough mixing of all the ingredients.

The reinforcing agents and additional inorganic filler (typically diatomite) are then added. A thorough mixing is then achieved and the inventive composition can be obtained therefrom.

The following example further illustrates the present invention.

EXAMPLE

An inventive composition having the following formulations listed in Table A was made according to the procedure detailed herein below.

TABLE A

| INGREDIENT | 1 LBS | WT. % |
|---|---|---|
| Talc[A] | 2100 | 52.4 |
| Mineral Wool[B] | 720 | 18.0 |
| Diatomite[C] | 80 | 2.0 |
| Polyester fiber-¼" | 5 | 0.1 |
| Polypropylene pulp[D] | 10 | 0.3 |
| Chlorinated paraffin[E] | 960 | 24.0 |
| Oleoresin[F] | 130 | 3.2 |
| TOTAL | 4005 | 100.0 |

NOTES
[A]Grade 36 Talc made by Windsor Minerals, Inc., of Windsor, VT.
[B]#10 White Wool from U.S. Gypsum Company.
[C]CELITE ® 292 a highly adsorptive, low density, natural grade of diatomite from Manville Service Corporation of Denver, Colorado.
[D]PULPEX ® ADH from Lextar Company.
[E]CHLOROWAX ® 50 from Diamond Shamrock Company
[F]XH-43 ® OIL from S & S Chemical Co.

The above inventive composition was made by charging a DAY ® Mixer with 110 lbs. of the talc, 360 lbs of the mineral wool was then added to the mix and agitation was begun. The remaining talc and mineral wool were then added while the mixer was still running. The oleoresin and 525 lbs. of chlorinated paraffin were then added and mixing then achieved for 30 minutes. The polyester-¼" fibers, diatomite, and polyolifen pulp were then added and mixing achieved for 10 minutes. The remaining chlorinated paraffin was then added and a thorough mixing for approximately 30 minutes was conducted. Samples of the inventive composition were then extruded into a 4"×27" length to be cut into 1 lb. pugs of a caulking or sealing compound.

The above 1 lb. pugs were then evaluated for fire resistance properties in accordance with the Standard for Tests for Flammability of Plastic Materials for Parts in Devices and Appliances, UL 94, Third Edition, Second Impression. The UL 94 test procedure and V0-V2 rating system were described herein earlier. The inventive composition was found to have a V0 rating which is the highest rating possible under the UL 94 test procedure. Essentially this means that when exposed to an open flame and then withdrawn, the inventive composition exhibited no combustability and no dripping or melting. These excellent results therefore conclusively indicate that fire resistance properties the inventive compound has.

The inventive compound was further found to pass the penetration test of ASTM D-5. This indicates that the compound is very pliable.

Furthermore, the invention composition was found to have a practical black-green appearance as well as being non-odoriferous.

In conclusion, the above data demonstrate that the inventive composition has properties which make it an excellent caulking or sealant compound.

Reasonable modifications and variations are possible from the foregoing without departing from the spirit or scope of the present invention.

We claim:

1. A composition suitable as a multipurpose sealing and caulking material having a fire resistance rating of V0 as measured by UL 94 test procedure comprising in weight percent the following ingredients;
    (a) 45-60 wt.% of at least one inorganic filler;
    (b) 12-30 wt.% of at least one ceramic fiber;
    (c) 0.1-0.5 wt.% of at least one reinforcing agent selected from the group consisting of organic fibers and polyolefin pulps;
    (d) 18-30 wt.% of at least one chlorinated paraffin tackifying agent; and
    (e) 2-5 wt.% of at least one oleoresinous oil.

2. A composition according to claim 1 wherein said inorganic filler is at least one selected from the group consisting of talc and diatomite.

3. A composition according to claim 1 wherein said ceramic fiber is temperature resistant to at least about 1000° F.

4. A composition according to claim 1 wherein said ceramic fiber is mineral wool.

5. A composition according to claim 1 wherein said organic fiber is a polyester fiber.

6. A composition according to claim 1 wherein said polyolefin pulp is a polypropylene pulp.

7. A composition according to claim 1 wherein said organic tackifying agent has a viscosity of from about 120-140 cps.

8. An extruded caulking or sealing compound made from the composition of claim 1.

9. A composition suitable as a multipurpose sealing and caulking material having a fire resistance rating of V0 as measured by UL 94 test procedure consisting essentially in weight percent of the following ingredients:
    (a) about 52.4 wt.% talc;
    (b) about 18.0 wt.% mineral wool;
    (c) about 2.0 wt.% diatomite;
    (d) about 0.1 wt.% polyester fiber;
    (e) about 0.3 wt.% of a polypropylene pulp;
    (f) about 24.0 wt.% of a chlorinated paraffin; and
    (g) about 3.2 wt.% of an oleoresinous oil.

10. An extruded caulking or sealing compound made from the composition of claim 9.

* * * * *